US009630648B2

(12) United States Patent
Shiraishi et al.

(10) Patent No.: US 9,630,648 B2
(45) Date of Patent: Apr. 25, 2017

(54) ELECTRIC POWER STEERING DEVICE

(71) Applicant: HONDA MOTOR CO., LTD., Minato-ku, Tokyo (JP)

(72) Inventors: Takehito Shiraishi, Wako (JP); Yasuo Shimizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/442,144

(22) PCT Filed: Sep. 20, 2013

(86) PCT No.: PCT/JP2013/075483
§ 371 (c)(1),
(2) Date: May 12, 2015

(87) PCT Pub. No.: WO2014/077031
PCT Pub. Date: May 22, 2014

(65) Prior Publication Data
US 2016/0137220 A1 May 19, 2016

(30) Foreign Application Priority Data
Nov. 19, 2012 (JP) ................................. 2012-252970

(51) Int. Cl.
| | |
|---|---|
| *B62D 5/04* | (2006.01) |
| *B62D 6/10* | (2006.01) |
| *G01L 5/22* | (2006.01) |
| *G01L 3/10* | (2006.01) |

(52) U.S. Cl.
CPC ............ *B62D 5/0463* (2013.01); *B62D 6/10* (2013.01); *G01L 3/102* (2013.01); *G01L 5/221* (2013.01)

(58) Field of Classification Search
CPC .................................................... B62D 5/0463
See application file for complete search history.

(56) References Cited

U.S. PATENT DOCUMENTS

| | | | | |
|---|---|---|---|---|
| 6,301,975 B1 * | 10/2001 | Chikaraishi | ............. | G01L 3/105 73/862 |
| 6,484,592 B2 * | 11/2002 | Sezaki | .................... | G01L 3/102 73/862.335 |

(Continued)

FOREIGN PATENT DOCUMENTS

| JP | 2006-103638 A | 4/2006 |
|---|---|---|
| JP | 2008-114641 A | 5/2008 |

(Continued)

*Primary Examiner* — Tony Winner
(74) *Attorney, Agent, or Firm* — Carrier Blackman & Associates, P.C.; Joseph P. Carrier; Jungli Wang

(57) ABSTRACT

A column-assist type electric power steering device (10) is provided with: a steering shaft (22); a magnetostrictive type torque sensor (80) that detects a torque produced in the steering shaft (22); and bearings (64, 65) that rotatably support the steering shaft (22). The magnetostrictive type torque sensor (80) includes a magnetostrictive film (81) disposed on an outer peripheral surface of the steering shaft (22), and a detection unit (83) that is disposed opposite the magnetostrictive film (81) and that detects a change in permeability. The bearings (64, 65) are installed at two locations in the axial direction of the steering shaft (22) in such a manner as to sandwich the detection unit (83).

3 Claims, 8 Drawing Sheets

(56) References Cited

U.S. PATENT DOCUMENTS

| | | | | |
|---|---|---|---|---|
| 6,959,781 | B2* | 11/2005 | Shimizu | B62D 6/10 |
| | | | | 180/444 |
| 7,581,455 | B2* | 9/2009 | Shimizu | B62D 6/10 |
| | | | | 73/862.333 |
| 7,806,005 | B2* | 10/2010 | Watanabe | B62D 6/10 |
| | | | | 73/862.333 |
| 8,245,813 | B2* | 8/2012 | Mizuno | B62D 3/123 |
| | | | | 180/444 |
| 2002/0117348 | A1* | 8/2002 | Shimizu | B62D 5/0406 |
| | | | | 180/443 |
| 2005/0178608 | A1* | 8/2005 | Shiino | B62D 5/0406 |
| | | | | 180/444 |
| 2008/0099272 | A1 | 5/2008 | Shimizu et al. | |
| 2009/0266640 | A1* | 10/2009 | Oshima | B62D 5/04 |
| | | | | 180/444 |
| 2010/0284643 | A1* | 11/2010 | Nuissl | F16C 33/60 |
| | | | | 384/577 |

FOREIGN PATENT DOCUMENTS

| | | |
|---|---|---|
| JP | 2009-090732 A | 4/2009 |
| JP | 2010-036679 A | 2/2010 |

* cited by examiner

ELECTRIC POWER STEERING DEVICE

TECHNICAL FIELD

The present invention relates to an improved electric power steering device.

BACKGROUND ART

Steering systems of many vehicles are equipped with an electric power steering device. The electric power steering devices are constructed to give a driver a comfortable steering feeling by alleviating necessary steering force to or effort be applied by the driver when rotating a steering wheel.

The electric power steering devices of this type include a rotational torque detection mechanism that is a device for, as a driver rotates the steering wheel, detecting intensity and direction of rotational torque (steering torque) acting on the steering system. Auxiliary or assisting torque is generated by an electric motor in accordance with results of the detection by the rotational torque detection mechanism, and the generated assisting torque is imparted to the steering system.

Particularly, the electric power steering devices of a construction where the assisting torque is transmitted to a steering shaft are called "column-assist-type electric power steering devices". One example of such column-assist-type electric power steering devices is known from Patent Literature 1.

The column-assist-type electric power steering device known from Patent Literature 1 includes: a steering wheel; a steering shaft connected at one end to the steering wheel; two bearings rotatably supporting the steering shaft; and a torque sensor for detecting steering torque of the steering shaft. The torque sensor is disposed between one of the bearings that is adjacent to the steering wheel and the steering wheel, and a contact-type pressure sensor that is used as the torque sensor.

In recent years, non-contact-type sensors capable of measuring steering torque without contacting the steering shaft has been used more and more popularly. A magnetostrictive torque sensor is known as an example of the non-contact-type sensors.

In a case where the magnetostrictive torque sensor is employed in the electric power steering device disclosed in Patent Literature 1, it is necessary to provide a magnetostrictive film on the outer circumferential surface of the steering shaft but also provide a detection section in opposed relation to the magnetostrictive film for detecting variation in magnetic permeability of the magnetostrictive film. The detection section includes a pair of detection circuits for detecting variation in magnetic permeability of the magnetostrictive film.

However, the following problems would occur in the case where the magnetostrictive torque sensor is used.

For example, in putting the vehicle into a garage, a drive may sometimes slowly rotate the steering wheel to the fullest extent. If the driver attempts to further rotate the steering wheel from the fullest extent, a bending moment can act on the steering wheel and the steering shaft connected to the steering wheel.

An intermediate shaft is connected at an angle to the other end of the steering shaft via a universal joint. Thus, once an impact is input, in response to a vehicle's tire colliding against a curbstone, a bending moment may sometimes act on the steering wheel and the steering shaft from the universal joint as well.

These bending moments differ in intensity among various cross-sectional positions in an axial direction of the rotation shaft. More specifically, the intensity of the bending moment is zero at a point of action and gradually increases as the cross-sectional position gets away from the point of application. Thus, bending moments of different intensity act on magnetostrictive materials differing in the cross-sectional position and the point of action. For two magnetostrictive materials, both a rotational moment and a bending moment are detected as same strain. Namely, by detecting the rotational moment, accuracy of the magnetostrictive torque sensor for detecting the bending moment would decrease. Because bending moments of different intensity act on the two magnetostrictive materials, the bending moments cannot be canceled out even if a difference in output, such as AC resistance, from corresponding detection means is taken into account. As a consequence, detection accuracy of the steering toque would decrease. Therefore, there is still a room for further improvement.

PRIOR ART LITERATURE

Patent Literature

Patent Literature 1: Japanese Patent Application Laid-Open Publication No. 2006-103638

SUMMARY OF INVENTION

Technical Problem

It is therefore an object to provide an electric power steering device equipped with a rotational torque detection mechanism which is capable of detecting intensity and direction of rotational torque acting on a rotation shaft.

Solution to Problem

According to the present invention, there is provided an improved electric power steering apparatus comprising: a magnetostrictive torque sensor that detects torque produced in a steering shaft; bearings that rotatably support the steering shaft; and a steering wheel provided on one end of the steering shaft, characterized in that the magnetostrictive torque sensor includes a magnetostrictive film provided on the outer circumferential surface of the steering shaft, and a detection section provided in opposed relation, to the magnetostrictive film for detecting variation in magnetic permeability, and in that the bearings are provided on two axially-spaced portions of the steering shaft in such a manner that the detection section is disposed between the bearings.

Preferably, a rotational torque detection device is constituted by the magnetostrictive torque sensor that detects intensity and direction of rotational torque acting on the steering shaft as a driver rotates the steering wheel, and which further comprises an assisting torque motor that generates auxiliary or assisting torque, the assisting torque motor generating assisting torque corresponding to a result of detection by the rotational torque detection device and imparting the generated assisting torque to the steering shaft.

Preferably, at least one of the bearings provided on the two axially-spaced portions comprises a double-row roller bearing.

Preferably, at least one of the bearings provided on the two axially-spaced portions comprises a plurality of single-row roller bearings provided in succession along the steering shaft.

Advantageous Effects of Invention

According to the present invention, the bearings are provided on the two axially-spaced portions of the steering shaft in such a manner as to interpose therebetween the detection section, i.e. in such a manner that the detection section is disposed between the bearings. A distance between the two bearings is set greater than a distance from the bearing, located closer to the steering wheel, to the steering wheel, because of which the degree of variation in bending moment applied to the steering shaft in a region between the two bearings is smaller than the degree of variation in bending moment applied to the steering shaft in a region from the bearing, located closer to the steering wheel, to the steering wheel. Because the degree of variation in bending moment is small between the two bearings, it is possible to enhance detection accuracy of steering torque detected by the magnetostrictive torque sensor.

Such an enhanced detection accuracy of the magnetostrictive torque sensor provided on the steering shaft is useful particularly in the column-assist-type electric power steering device where assisting torque is imparted to the steering shaft.

Further, according to the present invention, because the double-row roller bearing is employed as the bearing of the rotational torque detection mechanism, it is possible to reduce deflection and an angle of deflection, at that hearing section, of the steering shaft, so that bending moment from outside the bearing can be suppressed. Thus, as a driver rotates the steering wheel, the present invention can detect, with a high accuracy, intensity and direction of rotational torque acting on a steering system of the vehicle and thereby enhance a steering feeling of the driver.

Further, according to the present invention, by providing the two bearings, it is possible to reduce deflection and an angle of deflection, at those bearing sections, of the steering shaft, so that bending moment from outside the bearings can be suppressed. Thus, as the driver rotates the steering wheel, the present invention can detect, with a high accuracy, intensity and direction of rotational torque acting on the steering system of the vehicle and thereby enhance a steering feeling of the driver.

DESCRIPTION OF EMBODIMENTS

Now, preferred embodiments of the present invention will be described hereinbelow with reference to the accompanying drawings.

Embodiment 1

A description will be given, with reference to FIG. 1, about a first embodiment of a column-assist-type electric power steering device of the present invention equipped with a rotational torque detection device.

Figure 1:
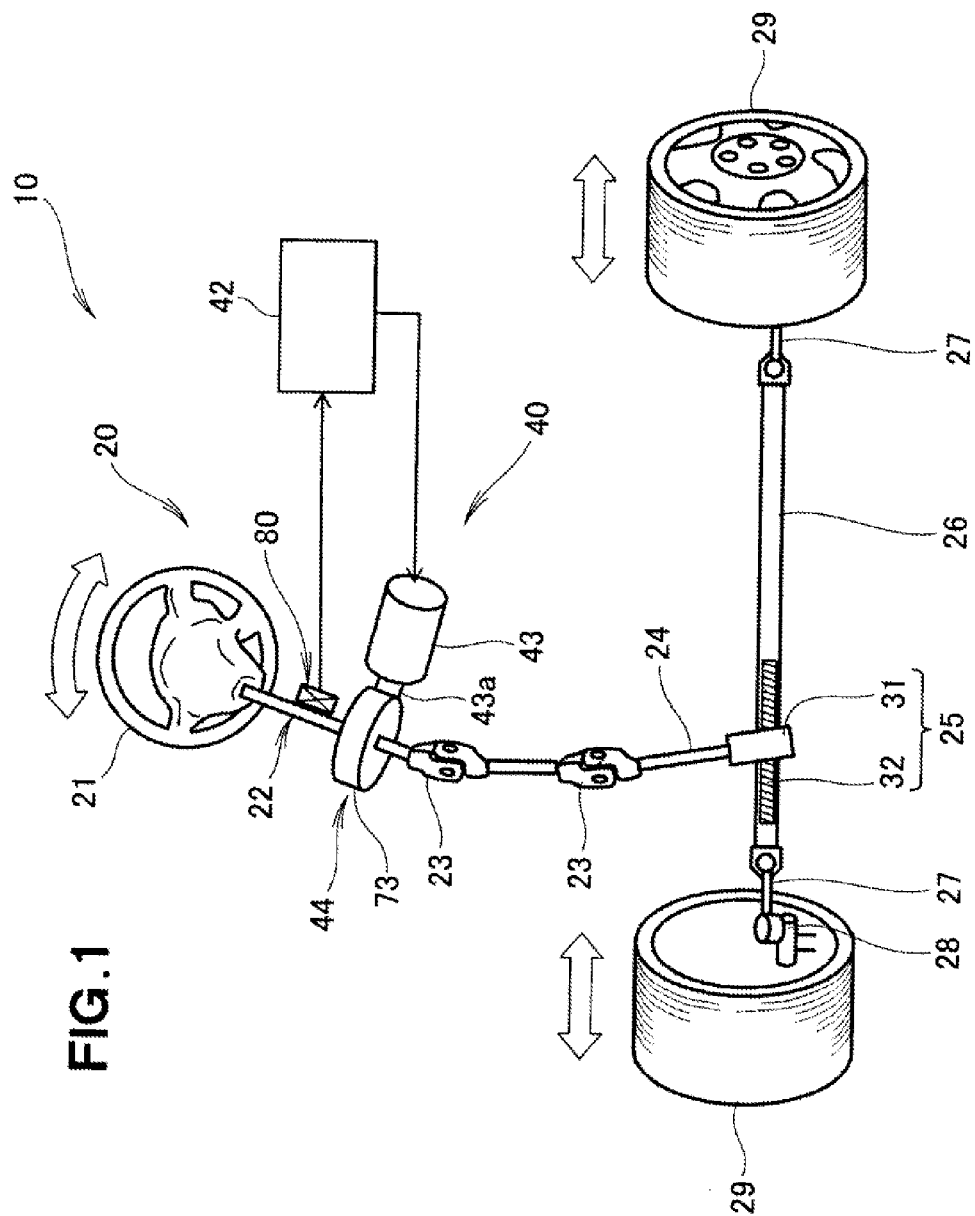
FIG. 1 is a schematic view of a first embodiment of a column-assist-type electric power steering device of the present invention.

As shown in FIG. 1, the column-assist-type electric power steering apparatus 10 (hereinafter referred to simply as "the electric power steering device 10") generally comprises a steering system 20 including various elements from a steering wheel 21 of a vehicle through to steerable road wheels (e.g., front road wheels) 29 of the vehicle; and an assisting torque mechanism 40 for applying auxiliary or assisting torque to the steering system 20.

In the steering system 20, a pinion shaft 24 is connected to the steering wheel 21 via a steering shaft 22 (hereinafter "shaft 22") and universal points 23, a rack shaft 26 is connected to the pinion shaft 24 via a rack-and-pinion mechanism 25, and the left and right steerable road wheels 29 are connected to the opposite ends of the rack shaft 26 via left and right, tie rods 27 and knuckles 28.

The rack and pinion mechanism 25 includes a pinion 31 formed on the pinion shaft 24, and a rack 32 formed on the rack shaft 26.

With the steering system 20 constructed as above, the left and right steerable road wheels 29 can be steered, via the rack-and-pinion mechanism 25 and the left and right tie rods 27, by steering torque produced by a driver steering the steering wheel 21.

The assisting torque mechanism 40 is a mechanism where steering torque applied to the steering wheel 21, of the steering system 20 is detected by means of a magnetostrictive torque sensor 80 (rotational torque detection device 80), a control signal is generated by a control section 42 on the basis of a torque detection signal output from the magnetostrictive torque sensor 80, assisting torque corresponding to the steering torque is generated by an assisting torque motor 43 (hereinafter referred to as "motor 43") on the basis of the control signal generated by the control section 42, the generated assisting torque is transmitted to the steering shaft 22 via a worm gear mechanism 44, and then the assisting torque is transmitted from the steering shaft 22 to the rack-and-pinion shaft 25. The magnetostrictive torque sensor 80 is constructed to detect the torque applied to the steering shaft 22 and output the detected torque as the torque detection signal.

In the electric power steering device 10, assisting torque output from the motor 43 is imparted or added to the steering torque generated by driver's steering, so that the steerable road wheels 29 are steered by the composite torque comprising the steering torque and the assisting torque.

Figure 2:
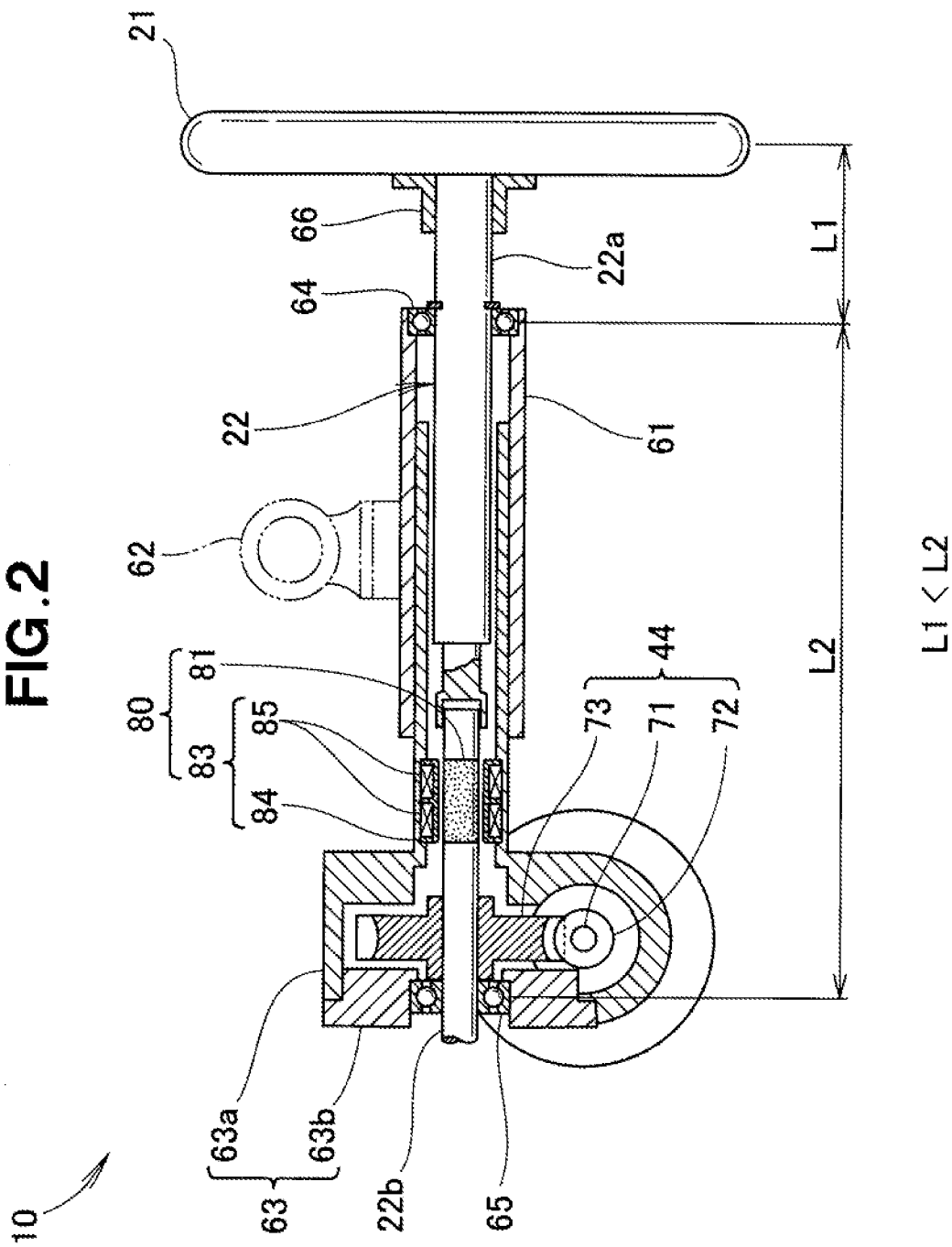
FIG. 2 is a sectional view showing primary sections of the electric power steering device shown in FIG. 1.

Further, as shown in FIG. 2, the steering wheel 21, the steering shaft 22 and the worm gear mechanism 44 are supported by a steering column 61. The steering column 61 is, for example, hung down from and supported by a steering hanger via a mounting section 62. The steering hanger is a pipe-shaped member extending in a vehicle width direction in a front vehicle body section.

A housing 63 having the worm gear mechanism 44 accommodated therein has one end portion inserted in the steering column 61, so that the housing 63 and the steering column 61 are interconnected integrally.

A first bearing 64 is mounted on an end portion of the steering column 61 adjacent to the steering wheel 21, and a second bearing 65 is mounted on another end portion of the housing 63. In the instant embodiment, the first and second bearings 64 and 65 are each a single-row roller bearing. A distance L2 between the first and second bearings 64 and 65 is set greater than a distance L1 from the steering wheel 21 to the first bearing 64. As will be detailed later, by making the distance L2 sufficiently great, it is possible to alleviate a degree of variation in bending moment produced between the first and second bearings 64 and 65.

The first and second bearings 64 and 65 and the steering shaft 22 are all supported rotatably. The steering wheel is mounted on one end of the steering shaft 22 via a boss 66. A magnetostrictive sensor 80 for detecting torque produced in the steering shaft 22 is provided between the first and second bearings 64 and 65.

The steering shaft 22 comprises a first shaft 22a connected to the steering wheel 21, and a second shaft 22b connected to the first shaft 22a via a coupling and extending toward one of the universal joints 23 (FIG. 1).

The housing 63 includes: a base 63a that has the one end portion inserted in the steering column 61 and that opens at the other end; and a lid 63a closing the opening of the base 63a and having fixed thereto the second bearing 65. In the base 63a, a length of the portion inserted in the steering column 61 is greater than a length of the portion not inserted in the steering column 61. By being sufficiently inserted in the steering column 61, the housing 63 can be supported with a high strength.

The motor 43 for driving the worm gear mechanism 44 has a motor shaft (43a in FIG. 1) extending therefrom. The motor shaft 43a is an output shaft having connected thereto a worm shaft of the worm gear mechanism 44. The worm shaft has a worm integrally formed thereon.

In the worm gear mechanism 44, a driven worm wheel 73 is kept in meshing engagement with a driving worm, so that torque is transmitted from the worm to the second shaft 22b via the worm wheel 73 that is mounted on the second shaft 22b. The second bearing 65 is disposed remoter from the steering wheel 21 than the worm wheel 73.

The magnetostrictive torque sensor 80 comprises a magnetostrictive film 81 that is provided on the outer circumferential surface of the second shaft 22b and varies in magnetostrictive characteristic (magnetic characteristic) in response to applied torque, and a detection section 83 that is disposed to surround the magnetostrictive film 81 in the circumferential direction of the film 81. The magnetostrictive film 81 has residual strains of different directions imparted thereto along the axial direction of the second shaft 22b.

The magnetostrictive film 81 is formed of a material which presents a greater variation in magnetic flux density in response to variation in strain. The magnetostrictive film 81 is, for example, a Ni—Fe alloy film formed on the outer circumferential surface of the second shaft 22b by vapor plating. Preferably, the alloy film has a thickness in the order of 30-50 μm. Note that the thickness of the alloy film may be smaller or greater than 30-50 μm. The magnetostrictive film 81 is a film formed on the entire outer circumferential surface of the second shaft 22b and having a generally uniform width and thickness.

If the Ni—Fe alloy film contains about 50% of Ni by weight, a magnetostriction effect tends to increase because a magnetostriction constant increases. Thus, it is preferable to use a material having such a content percentage of Ni. For example, the Ni—Fe alloy film is formed of a material having 50-70% of Ni by weight and 50-30% of Fe by weight.

Note that the magnetostrictive film 81 may be any other film than the Ni—Fe alloy film as along as it is of a ferromagnetic material. For example, the magnetostrictive film 81 may be a Co—Fe alloy film or a Sm—Fe alloy film.

The detection section 83 electrically detects the magnetostriction effect produced in the magnetostrictive film 81 and outputs a signal of the detected magnetostriction effect as the torque detection signal. The detection section 83 comprises a coil bobbin 84 fixed to the second shaft 22b around the outer circumference of the magnetostrictive film 81, and a pair of coils 85 each multiplex-wound on the coil bobbin 84. Each of the coils 85 comprises an exciting coil for applying an AC voltage to the magnetostrictive film 81, and a detecting coil for detecting variation in magnetic permeability produced in the magnetostrictive film 81. Namely, the exciting coil and the detecting coil are wound in each of the coils 85.

A gap between the magnetostrictive film 81 and the coil bobbin 84 is set in a range of about 0.5 to 1 mm. The coils 85 are excited by a suitable frequency in a range of 1 to 100 kHz, such as 10 kHz, so that magnetic permeability between the coils 85 and the magnetostrictive film 81 imparted with anisotropy is detected.

As a driver steers the steering wheel 21, the steering shaft 22 rotates together with the steering wheel 21, so that steering torque is produced in the steering shaft 22. This steering torque is detected by the magnetostrictive torque sensor 80, and the control section (42 in FIG. 1) activates the motor 43 on the basis of the detected steering torque. By the activation of the motor 43, the worm rotates, so that the worm wheel 73 rotates. By the rotation of the worm wheel 73, assisting torque is transmitted to the steering shaft 22.

Figure 3:
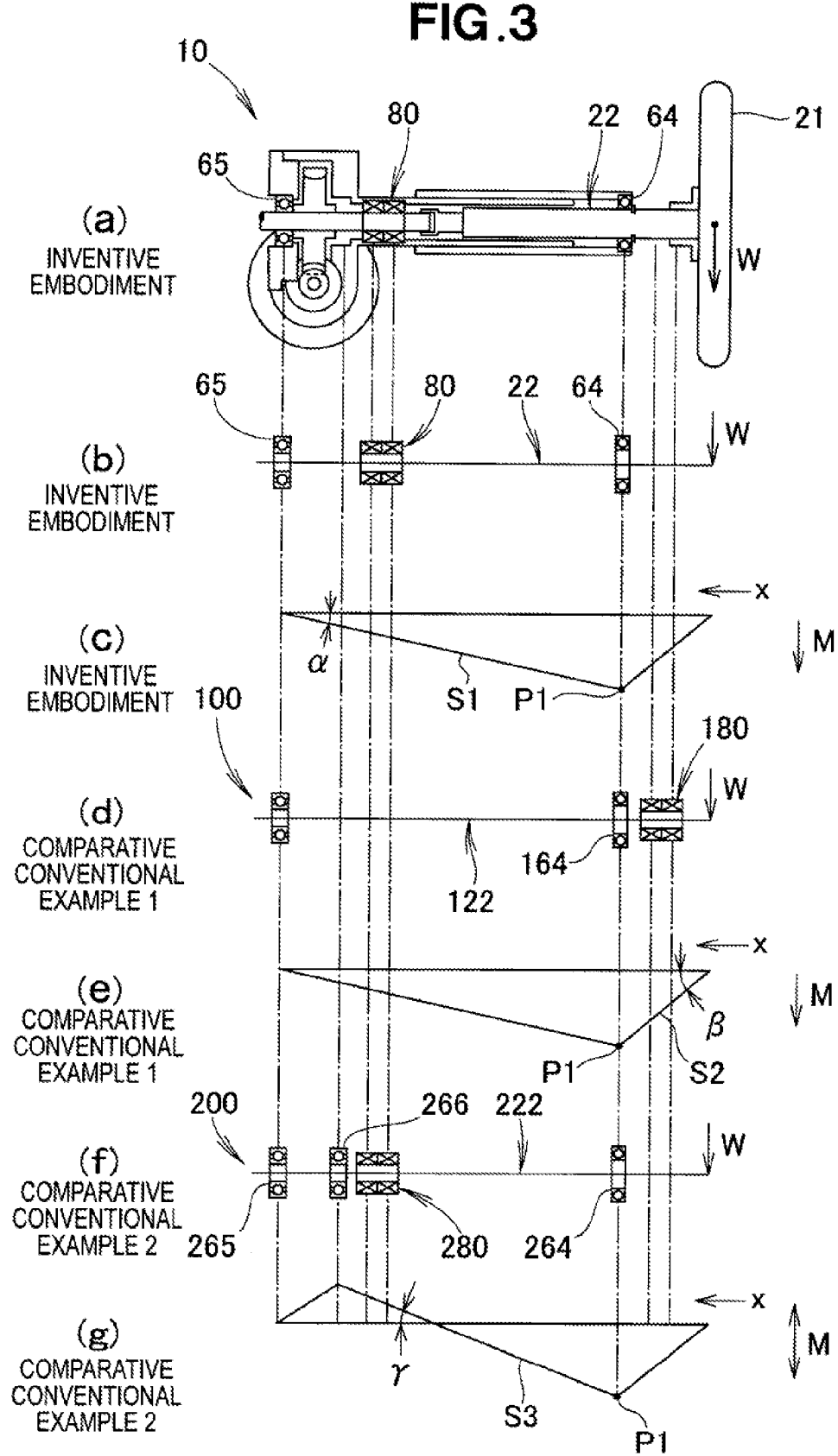
FIG. 3 is a diagram comparatively showing the embodiment of the column-assist-type electric power steering device shown in FIG. 2 and a comparative conventional example of a column-assist-type electric power steering device.

FIG. 3(*a*) shows the embodiment of the electric power steering device 10 (inventive embodiment), and FIG. 3(*b*) is a schematic representation of the electric power steering device 10 shown in FIG. 3(*a*).

In the inventive embodiment, the two bearings 64 and 65 are disposed on the steering shaft 22, as shown in FIG. 3(*a*) and FIG. 3(*b*). The magnetostrictive sensor 80 is disposed between the bearings 64 and 65. As a load W is applied to the steering wheel 21, a bending moment is produced in the steering shaft 22.

FIG. 3(*c*) is a bending moment diagram showing intensity of the bending moment produced in the steering shaft 22 shown in FIG. 3(*b*), where the horizontal axis represents various positions of the steering shaft 22 while the vertical axis represents the intensity of the bending moment.

As shown in FIG. 3(*a*), FIG. 3(*b*) and FIG. 3(*c*), the bending moment M produced in the steering shaft 22 in response to the load W applied to an end portion of the steering shaft 22 becomes maximum P1 at the first bearing 64. The bending moment M having become maximum P1 at the first bearing 64 gradually decreases in a direction toward the second bearing 65 and becomes zero at the second bearing 65. α in FIG. 3(*c*) represents an angle formed by the horizontal axis and a line S1 interconnecting a position corresponding to the first bearing 64 and a position corresponding to the second bearing 65.

Further, FIG. 3(*d*) is a schematic representation of comparative conventional example 1 of an electric power steering device 100. The electric power steering device 100 includes a magnetostrictive torque sensor 180 disposed closer to a steering wheel (see FIG. 3(*a*)) than a first bearing 164.

As a load W is applied to an end portion of a steering shaft 122, a bending moment is produced in the steering shaft 122, as shown in FIG. 3(*d*).

FIG. 3(*e*) is a bending moment diagram showing intensity of the bending moment produced in the steering shaft 22 in the state shown in FIG. 3(*d*), where the horizontal axis represents various positions of the steering shaft 122 while the vertical axis represents the intensity of the bending moment.

As shown in FIG. 3(*d*) and FIG. 3(*e*), the bending moment M produced in the steering shaft 122 in response to the load W applied to the end portion of the steering shaft 122 becomes maximum P1 at the position of the first bearing 164. The bending moment M having become maximum P1 at the position of the first bearing 164 gradually decreases in a direction toward a second bearing 165 and becomes zero at the second bearing 165. β in FIG. 3(*e*) represents an angle formed by the horizontal axis and a line S2 interconnecting a position corresponding to the end portion of the steering shaft 122 and a position corresponding to the first bearing 164.

FIG. 3(*f*) is a schematic representation of comparative conventional example 2 of an electric power steering device 200. In this electric power steering device 200, a third bearing 266 is disposed between a first bearing 264 and a second bearing 265, and a magnetostrictive torque sensor 280 is disposed between the first bearing 264 and the third bearing 266. In this case too, as a load W is applied to an end portion of a steering shaft 222, a bending moment is produced in the steering shaft 222.

FIG. 3(*g*) is a bending moment diagram in the state shown in FIG. 3(*f*), where the horizontal axis represents various positions of the steering shaft 222 while the vertical axis represents the intensity of the bending moment.

The bending moment M produced in the steering shaft 222 in response to the load W applied to the end portion of the steering shaft 222 becomes maximum P1 at the position of the first bearing 264. The bending moment M having become maximum P1 at the position of the first bearing 264 reaches, at the third bearing 266, a peak of a bending moment opposite in direction from the bending moment applied to the first bearing 264. From the third bearing 266, the bending moment gradually decreases in a direction toward the second bearing 265 and becomes zero at the second bearing 265. γ in FIG. 3(*g*) represents an angle formed by the horizontal axis and a line S3 interconnecting a position corresponding to the first bearing 264 and a position corresponding to the third bearing 266.

Figure 4:
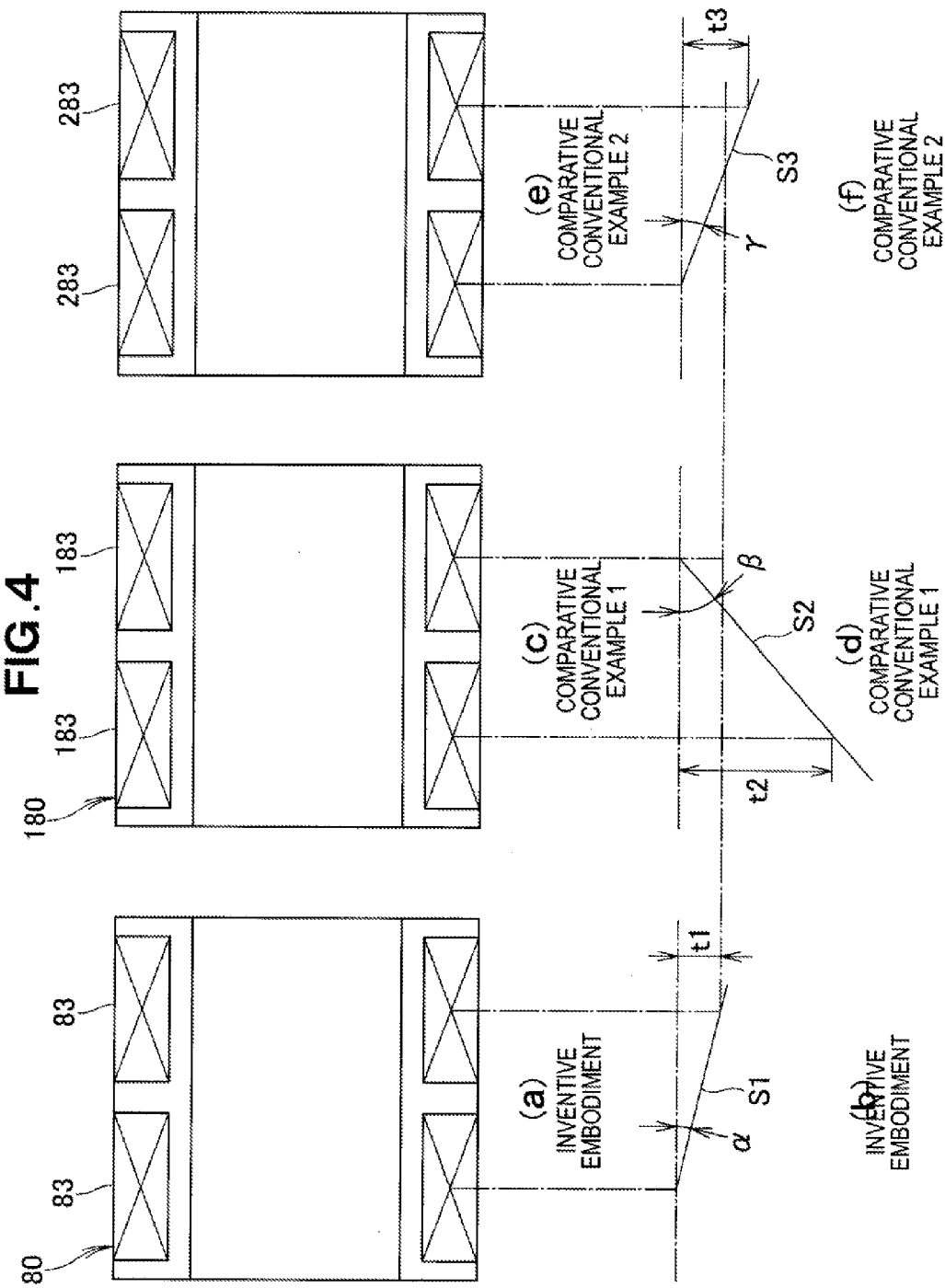
FIG. 4 is a diagram explanatory of advantageous benefits achieved by the column-assist-type electric power steering device shown in FIG. 2.

The following compare the inventive embodiment and comparative conventional examples 1 and 2, with reference to FIGS. 3 and 4. In the inventive embodiment shown FIG. 4(*a*) and FIG. 4(*b*), a difference between bending moments being applied to the individual detection sections 83 is t1.

In comparative conventional example 1 shown FIG. 4(*c*) and FIG. 4(*d*), a difference between bending moments being applied to the individual detection sections 183 is t2. Similarly, in comparative conventional example 2 shown FIG. 4(*e*) and FIG. 4(*f*), a difference between bending moments being applied to the individual detection sections 283 is t3.

The respective bending moment differences in the inventive embodiment, comparative conventional example 1 and comparative conventional example 2 are in a relationship of t1≤t3<t2. In the inventive embodiment, the magnetostrictive torque sensor 80 is provided at a position where the degree of variation in bending moment is small, i.e. between the bearings 64 and 65. In the inventive embodiment, the difference between bending moments being applied to the individual detection sections 83 is small, because of which, it is possible to enhance a detection accuracy of steering torque detected by the magnetostrictive torque sensor 80.

The angle β in comparative conventional example 1 is great as compared to the angle α in the inventive embodiment (β<α). Namely, in comparative conventional example 1, the magnetostrictive torque sensor 180 is provided at a position where the degree of variation in bending moment is great as compared to that in the inventive embodiment. Thus, the difference t2 between the bending moments being applied to the individual detection sections 183 is great as compared to that t1 in the inventive embodiment. Because the difference between the bending moments being applied to the individual detection sections 183 is great, the detection accuracy of steering torque detected by the magnetostrictive torque sensor 180 decreases. The angle γ in comparative conventional example 2 too is great as compared to the angle α in the inventive embodiment, and thus, generally the same as above can be said.

The foregoing description may be summarized as follows.

As seen particularly in FIG. 2, the bearings 64 and 65 are on two axially-spaced portions of the steering shaft 22 in such a manner that the detection sections 83 are disposed between the bearings 64 and 65. Generally, the distance L2 between the first and second bearings 64 and 65 is set greater than the distance L1 from the first bearing 64, located closer to the steering wheel 21, to the steering wheel 21. Because the distance L2 is greater than the distance L1, the degree of variation in bending moment from the first hearing 64 to the steering shaft 22 in a region between the two hearings 64 and 65 is small as compared to the degree of variation in bending moment applied to the steering shaft 22 in a region from the bearing 64, located closer to the steering wheel 21 to the steering wheel 21. Because the degree of variation in bending moment is small in the region between the two bearings 64 and 65, it is possible to enhance the detection accuracy of the steering torque detected by the magnetostrictive torque sensor 80.

Such an enhanced detection accuracy of the magnetostrictive torque sensor 80 provided on the steering shaft 22 is useful particularly in the column-assist-type electric power steering device 10 where assisting torque is imparted or added to the steering shaft 22.

Note that the degree of variation in bending moment indicates an amount of variation, per predetermined unit length, of the bending moment being applied to the steering shaft 22; more simply, the degree of variation in bending moment indicates an inclination of any one of the lines of the bending moments shown in FIGS. 3 and 4 (see angles α to γ).

Embodiment 2

Figure 5:
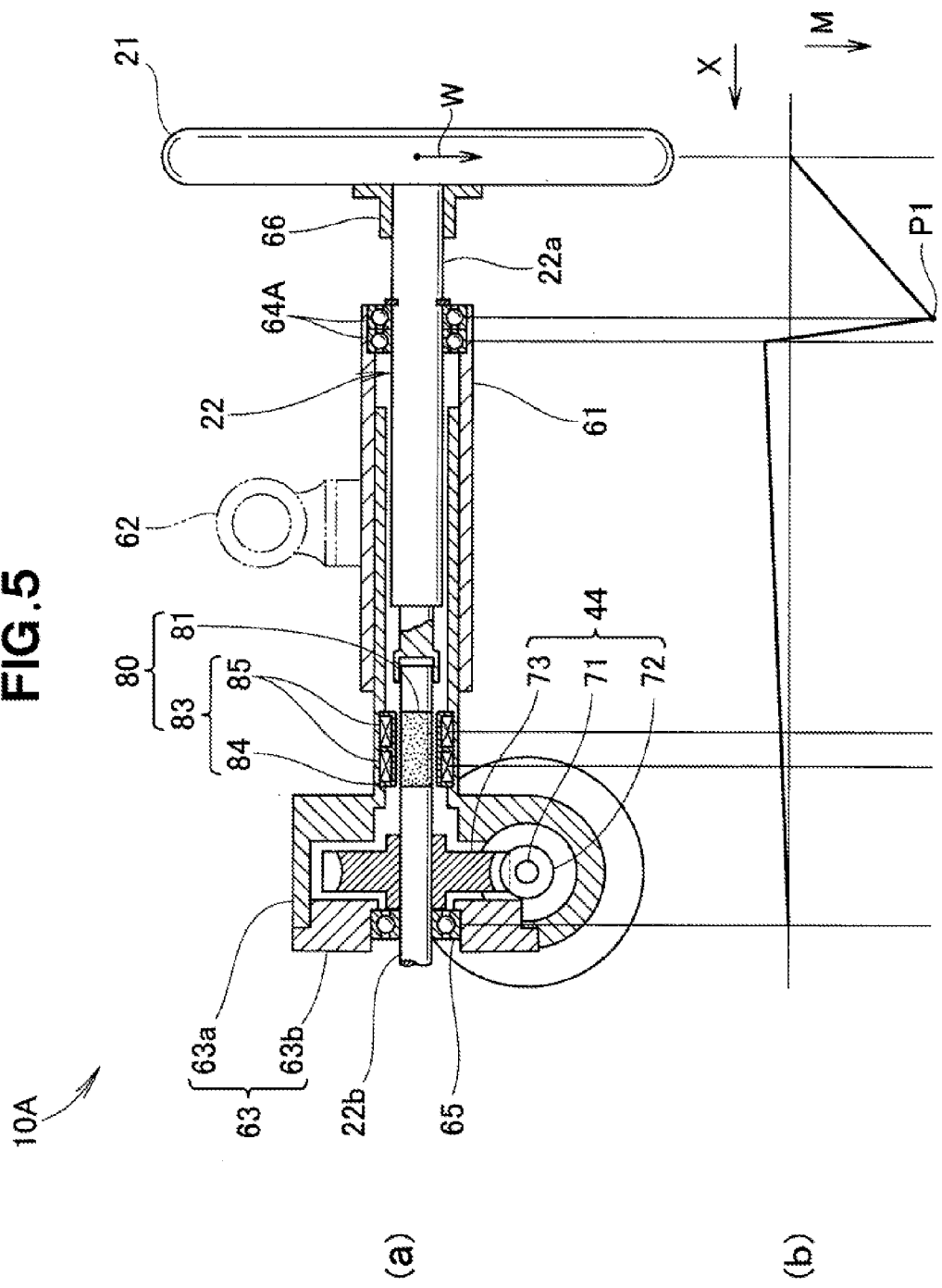
FIG. 5 is a view of a second embodiment of the column-assist-type electric power steering device of the present invention.

A description will now be given about a second embodiment of the present invention. FIG. 5(*a*) shows a sectional construction of the second embodiment of the electric power steering device, equipped with the rotational torque detection device, in a sectional view corresponding to FIG. 2. The second embodiment of the electric power steering device is different from the first embodiment of the electric power steering device in terms of the number of bearings provided on one portion of the steering shaft 22.

The second embodiment of the electric power steering device 10A, as shown in FIG. 5(*a*), includes first bearings 64A comprising a plurality of single-row roller bearings provided in succession along the steering shaft 22. The electric power steering device 10A constructed in this manner too can achieve the predetermined advantageous benefits of the present invention.

As also shown in FIG. 5(*b*), the plurality of first bearings 64A are provided in the second embodiment of the electric power steering device 10A. Thus, the steering shaft 22 presents a decreased amount of deflection to external force W. Such a decreased amount of deflection too can decrease the degree of variation in bending moment. With such a decreased degree of variation in bending moment, it is possible to enhance the detection accuracy of the steering torque detected by the magnetostrictive torque sensor 80.

Embodiment 3

Figure 6:
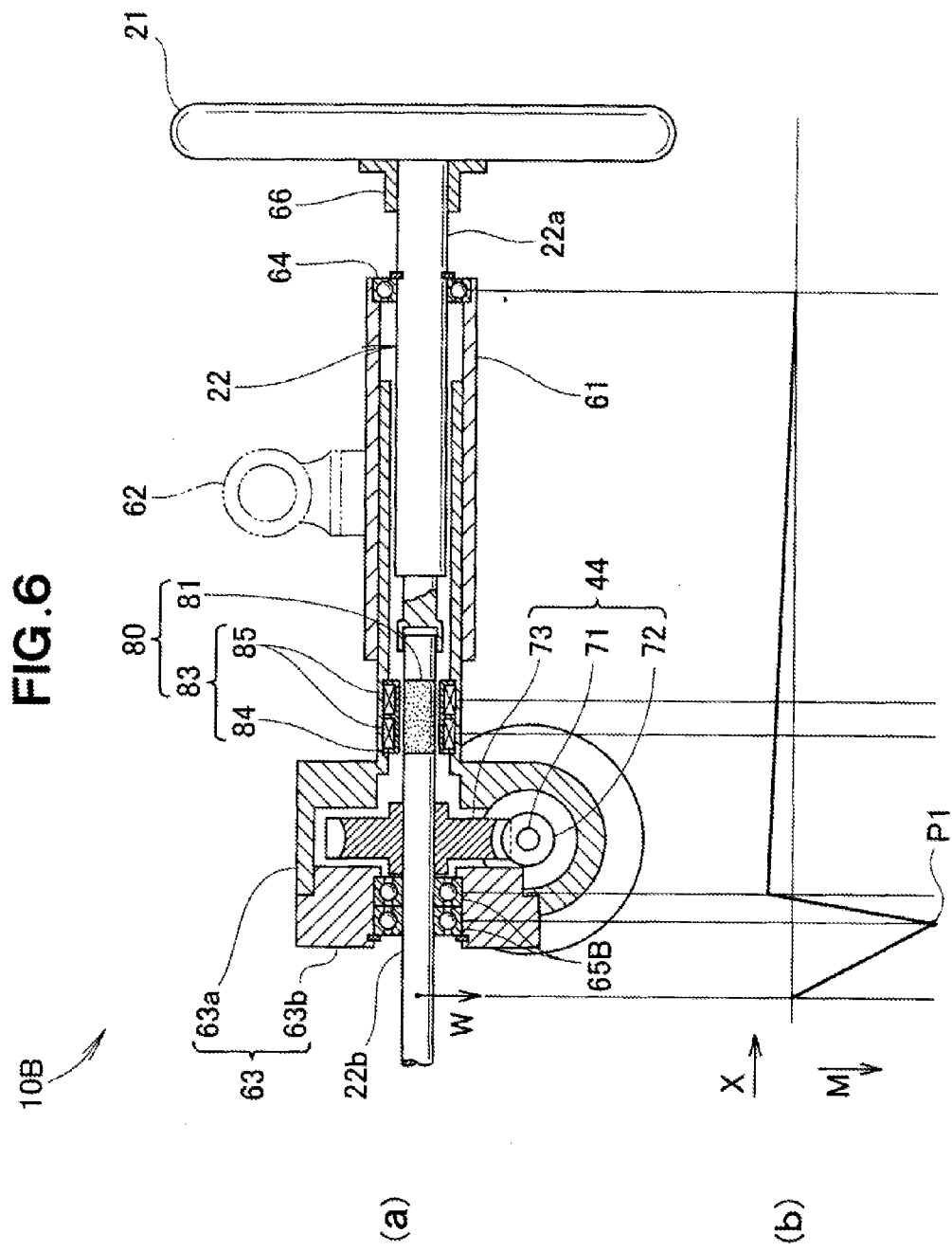
FIG. 6 is a view of a third embodiment of the column-assist-type electric power steering device of the present invention.

A description will now be given about a third embodiment of the present invention. FIG. 6(*a*) shows a sectional construction of the third embodiment of the electric power steering device, equipped with the rotational torque detection device, in a sectional view corresponding to FIG. 2. The third embodiment of the electric power steering device is different from the first embodiment of the electric power steering device in terms of the number of bearings provided on one portion of the steering shaft 22.

The third embodiment of the electric power steering device 10B, as shown in FIG. 6(*a*), includes second hearings 65B comprising a plurality of single-row roller bearings provided in succession along the steering shaft 22. The electric power steering device 10B constructed in this manner too can achieve the predetermined advantageous benefits of the present invention.

As also shown in FIG. 6(*b*), the plurality of second bearings 65B are provided in the third embodiment of the electric power steering device 10B. Thus, the steering shaft 22 presents a decreased amount of deflection to external force W. Such a decreased amount of deflection too can decrease the degree of variation in bending moment. With such a decreased degree of variation in bending moment, it is possible to enhance the detection accuracy of the steering torque detected by the magnetostrictive torque sensor 80.

Particularly, the provision of the plurality of second bearings 65B adjacent to the universal joint can enhance the detection accuracy irrespective of application of external force from the side of the universal joint.

Providing the two single-row roller bearings as the second bearings 65B can reduce deflection and an angle of deflection, at the second bearings 65B, of the steering shaft 22. Also, the second bearings 65B can suppress bending moment from outside. Thus, as the driver rotates the steering wheel 21, it is possible to detect, with a high accuracy, intensity and direction of rotational torque acting on the vehicle steering system 20 and thereby enhance a steering feeling of the driver.

In the third embodiment, three or more second bearings 65B constructed as above may be provided, and the first bearing 64 may comprise a plurality of single-row roller bearings.

Embodiment 4

Figure 7:
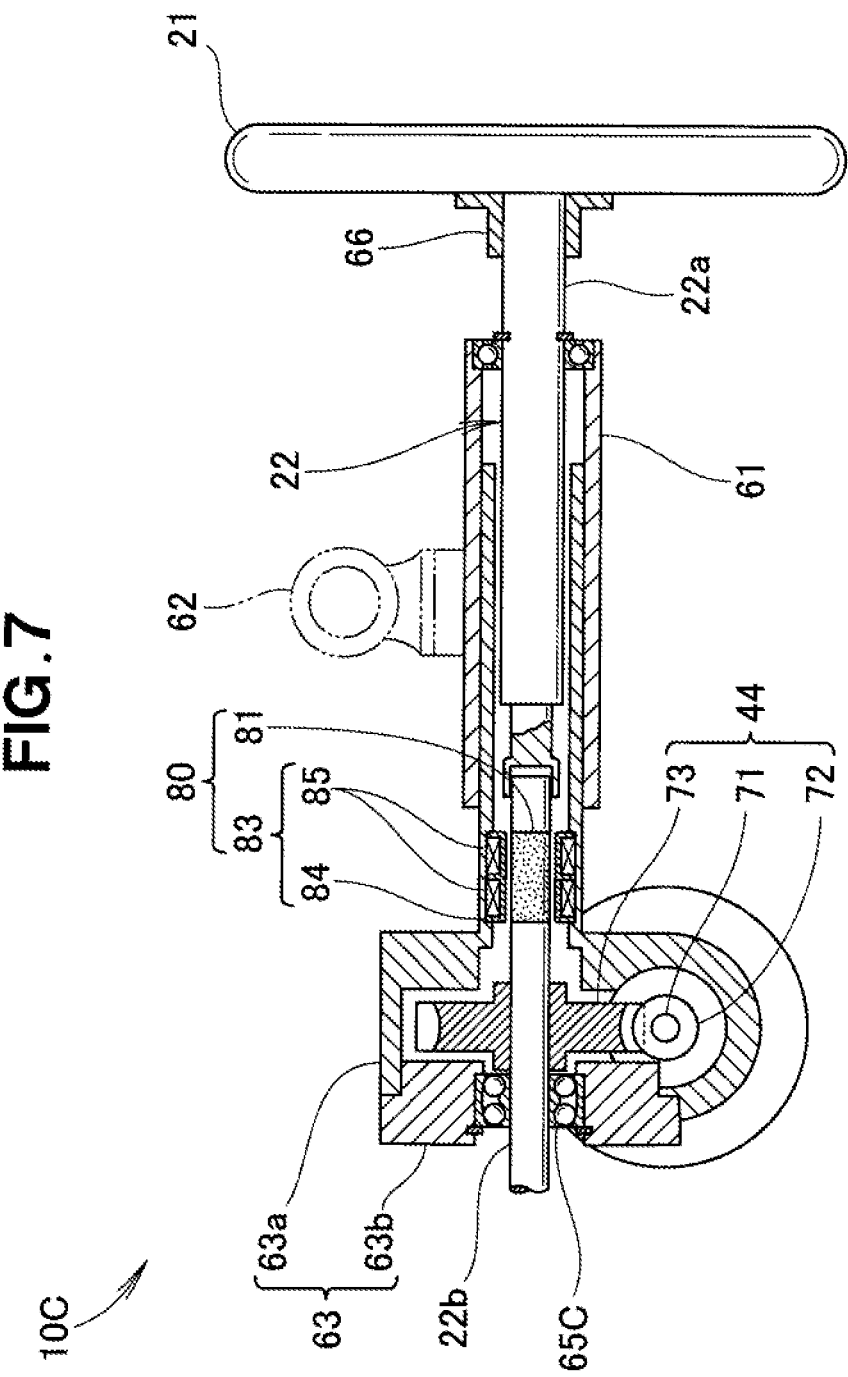
FIG. 7 is a sectional view showing primary sections of a fourth embodiment of the column-assist-type electric power steering device of the present invention.

A description will now be given about a fourth embodiment of the present invention. FIG. 7 shows a sectional construction of the fourth embodiment of the electric power steering device, equipped with the rotational torque detection device, in a sectional view corresponding to FIG. 2. The fourth embodiment of the electric power steering device is different, from the first embodiment of the electric power steering device in terms of the type of the hearing employed.

In the fourth embodiment of the electric power steering device 10C, as shown in FIG. 7, the second bearing 65C comprises a double-row roller bearing. The fourth embodiment of the electric power steering device 10C constructed in this manner too can achieve the predetermined advantageous benefits.

Employing the double-row roller bearing as the second bearings 65C can reduce deflection and an angle of deflection, at the second bearings 65C, of the steering shaft 22, and it can also suppress a bending moment from outside the second bearings 65C. Thus, when the driver rotates the steering wheel 21, it is possible to detect, with a high accuracy, intensity and direction of rotational torque acting on the vehicle steering system 20 and thereby enhance a steering feeling of the driver. In the fourth embodiment, the first bearing 64 may comprise a double-row roller bearing.

Embodiment 5

Figure 8:
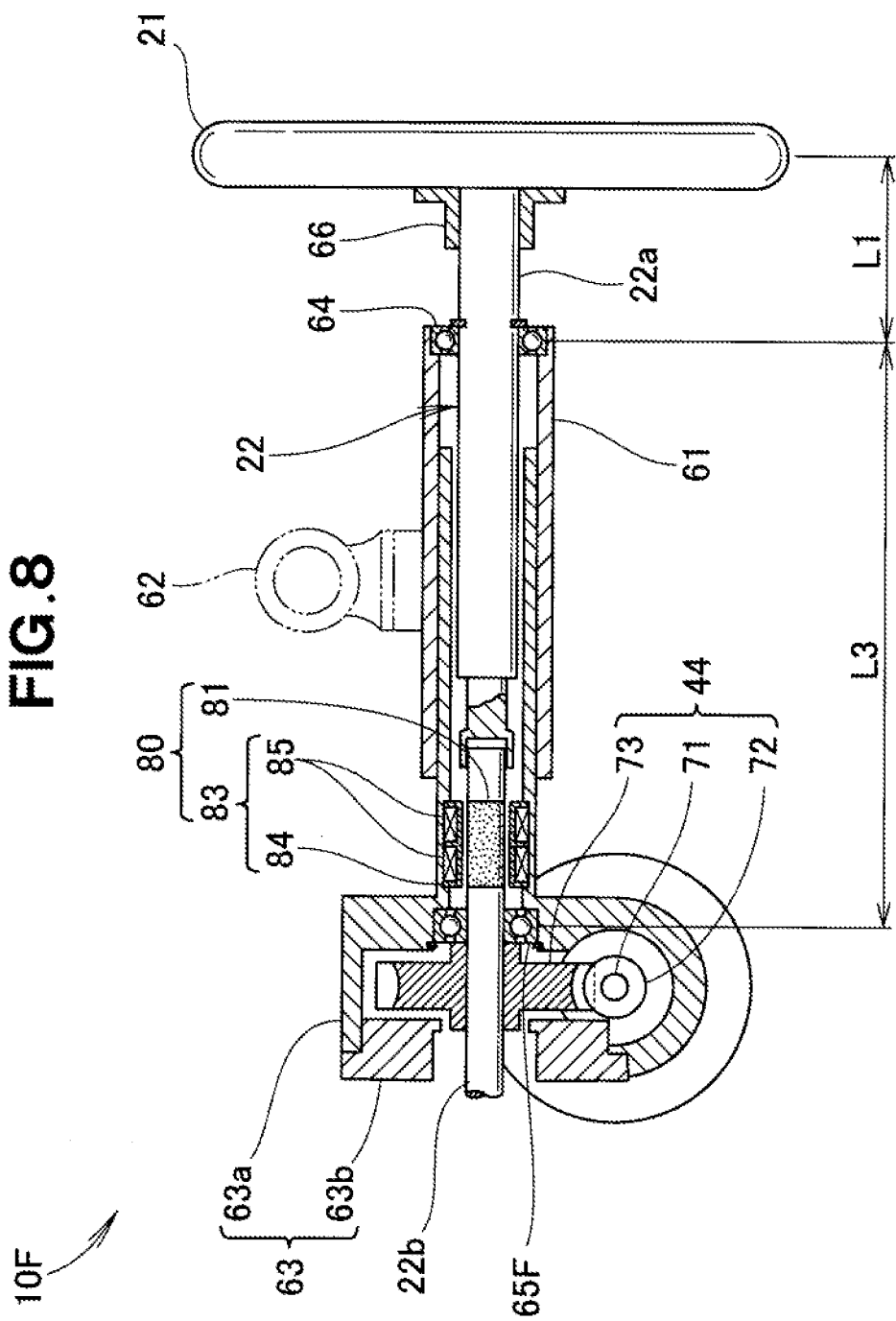
FIG. 8 is a sectional view showing primary sections of a fifth embodiment of the column-assist-type electric power steering device of the present invention.

A description will now be given about a fifth embodiment of the present invention. FIG. 8 shows a sectional construction of the fifth embodiment of the electric power steering device, equipped with the rotational torque detection device, in a sectional view corresponding to FIG. 2. The fifth embodiment of the electric power steering device is different from the first embodiment of the electric power steering device in terms of the position of the bearing employed.

In the fifth embodiment of the electric power steering device 10F, as shown in FIG. 8, the second bearing 65F is disposed closer to the steering wheel 21 than the worm wheel 73. In this case too, a distance L3 between the first and second bearings 64 and 65F is greater than the distance L1 from the steering wheel 21 to the first bearing 64. The fifth embodiment of the electric power steering device 10F constructed in this manner too can achieve the predetermined advantageous benefits.

Note that the distance between the first and second bearings 64 and 65 (L2 in FIG. 2) in the first embodiment, where the second bearing is disposed remoter from the steering wheel 21 than the worm wheel 73, is greater than the distance L3 between the first and second bearings 64 and 65F in the fifth embodiment. Because the degree of variation in bending moment can be reduced as the distance between the first and second bearings increases, the first embodiment of the electric power steering device is more preferable than the fifth embodiment of the electric power steering device.

Further, the various combinations of the bearings described above in relation to the embodiments of the present invention may of course be modified as necessary. For example, a plurality of single-row roller bearings may be provided in succession on one portion of the steering shaft 22 with a double-row roller bearing provided on the other portion of the steering shaft 22.

INDUSTRIAL APPLICABILITY

The rotational torque detection device of the present invention is well suited for application to column-assist-type electric power steering devices.

LEGEND

10, 10A, 10B, 10C, 10F . . . column-assist-type electric power steering apparatus, 21 . . . steering wheel, 22 . . .

steering shaft, 43 . . . assisting torque motor, 64, 64A . . . first hearing (single-row roller bearing), 65, 65B, 65F . . . second bearing (single-row roller bearing), 65C . . . second bearing (double-row roller bearing), 80 . . . magnetostrictive torque sensor, 81 . . . magnetostrictive film, 83 . . . detection section

The invention claimed is:

1. An electric power steering apparatus comprising:
a steering column and a housing which are integrally interconnected;
a magnetostrictive torque sensor that detects torque produced in a steering shaft;
bearings that rotatably support the steering shaft on the steering column;
a steering wheel attached directly on one end of the steering shaft;
a universal joint provided on another end of the steering shaft;
a pinion shaft connected to the steering shaft via the universal joint;
a rack shaft operably connected to the pinion shaft; and
a worm gear mechanism accommodated in the housing and transmitting an assisting torque generated by an assisting torque motor to the steering shaft,
wherein:
the magnetostrictive torque sensor includes a magnetostrictive film provided on an outer circumferential surface of the steering shaft, and a detection section provided in opposed relation to the magnetostrictive film for detecting variation in magnetic permeability,
the bearings are provided on only two axially-spaced portions of the steering shaft in such a manner that the detection section and the worm gear mechanism are disposed between the bearings, the bearings consisting of at least one first bearing provided on the steering column between the detection section and the steering wheel and at least one second bearing provided on the housing between the detection section and the universal joint,
a rotational torque detection device is constituted by the magnetostrictive torque sensor that detects intensity and direction of rotational torque acting on the steering shaft as the steering wheel rotates,
the electric power steering apparatus further comprises an assisting torque motor that generates assisting torque based on a result of detection by the rotational torque detection device and imparts the generated assisting torque to the steering shaft, and
a number of the at least one second bearing is larger than a number of the at least one first bearing.

2. The electric power steering apparatus according to claim 1, wherein the at least one second bearing comprises a plurality of second bearings and the at least one first bearing consists of one first bearing.

3. An electric power steering apparatus comprising:
a steering column and a housing which are integrally interconnected;
a magnetostrictive torque sensor that detects torque produced in a steering shaft;
bearings that rotatably support the steering shaft on the steering column;
a steering wheel attached directly on one end of the steering shaft;
a universal joint provided on another end of the steering shaft;
a pinion shaft connected to the steering shaft via the universal joint;
a rack shaft operably connected to the pinion shaft; and
a worm gear mechanism accommodated in the housing and transmitting an assisting torque generated by an assisting torque motor to the steering shaft,
wherein:
the magnetostrictive torque sensor includes a magnetostrictive film provided on an outer circumferential surface of the steering shaft, and a detection section provided in opposed relation to the magnetostrictive film for detecting variation in magnetic permeability,
the bearings are provided on only two axially-spaced portions of the steering shaft in such a manner that the detection section and the worm gear mechanism are disposed between the bearings, the bearings consisting of at least one first bearing provided on the steering column between the detection section and the steering wheel and at least one second bearing provided on the housing between the detection section and the universal joint,
a rotational torque detection device is constituted by the magnetostrictive torque sensor that detects intensity and direction of rotational torque acting on the steering shaft as the steering wheel rotates,
the electric power steering apparatus further comprises an assisting torque motor that generates assisting torque based on a result of detection by the rotational torque detection device and imparts the generated assisting torque to the steering shaft, and
the at least one first bearing consists of one single-row roller bearing and the at least one second baring consists of one double-row roller bearing.

* * * * *